United States Patent
Bito

(10) Patent No.: US 9,665,545 B2
(45) Date of Patent: May 30, 2017

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Koji Bito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/044,716

(22) Filed: Feb. 16, 2016

(65) Prior Publication Data

US 2017/0060816 A1 Mar. 2, 2017

(30) Foreign Application Priority Data

Aug. 24, 2015 (JP) ................. 2015-164820

(51) Int. Cl.
*G06F 3/12* (2006.01)
*G06F 17/21* (2006.01)
(Continued)

(52) U.S. Cl.
CPC .......... *G06F 17/211* (2013.01); *G06F 3/0482* (2013.01); *G06F 17/2205* (2013.01)

(58) Field of Classification Search
None
See application file for complete search history.

(56) References Cited

U.S. PATENT DOCUMENTS 7,796,282 B2 * 9/2010 Yamakawa ............. G06F 3/121
358/1.14

2001/0043346 A1 * 11/2001 Roztocil ............... G06F 17/212
358/1.9
(Continued)

FOREIGN PATENT DOCUMENTS

JP H11-259384 A 9/1999
JP H11-259387 A 9/1999
(Continued)

OTHER PUBLICATIONS

Oct. 14, 2016 Office Action issued in U.S. Appl. No. 15/018,452.
U.S. Appl. No. 15/018,452, filed Feb. 8, 2016 in the name of Bito et al.

*Primary Examiner* — Dung Tran
(74) *Attorney, Agent, or Firm* — Oliff PLC

(57) ABSTRACT

An information processing apparatus includes the following units. A first accepting unit accepts specified document data. A second accepting unit accepts a specified processing function to be executed on the document data. A process performing unit performs, on the document data, a process corresponding to the accepted processing function. A memory stores information about processing function groups each constituted by plural processing functions, and stores, in association with one another, the accepted document data, a processing function group to which the accepted processing function belongs, and a processing function that has been executed on the document data. A display controller performs control to display, in a case where the first accepting unit accepts again the specified document data, the processing function group stored in the memory in association with the specified document data in such a manner that the executed processing function is identifiable.

8 Claims, 17 Drawing Sheets

(51) Int. Cl.
*G06F 17/22* (2006.01)
*G06F 3/0482* (2013.01)

(56) References Cited

U.S. PATENT DOCUMENTS

| 2002/0116399 | A1* | 8/2002 | Camps ................... G06F 17/24 |
| 2012/0089640 | A1* | 4/2012 | Arumainayagam ... G06Q 10/10 707/770 |
| 2013/0198624 | A1* | 8/2013 | Aymeloglu ......... G06F 17/2288 715/273 |
| 2014/0063539 | A1* | 3/2014 | Hayashi ............. H04N 1/00408 358/1.15 |

FOREIGN PATENT DOCUMENTS

| JP | 2007-179228 A | 7/2007 |
| JP | 2010-033227 A | 2/2010 |

* cited by examiner

FIG. 7

DOCUMENT ID: 12345678
DOCUMENT NAME: ORDER RECEPTION FORM

| TOOL GROUP INFORMATION | |
|---|---|
| TOOL GROUP ID | TOOL GROUP NAME |
| 10000000 | ORDER RECEPTION OPERATION VIA FACSIMILE |

| TOOL INFORMATION LIST | | | |
|---|---|---|---|
| ID OF EXECUTED TOOL | NAME OF EXECUTED TOOL | DATE/TIME OF EXECUTION | USER ID OF EXECUTOR |
| 40013456 | FACSIMILE RECEPTION | 03/27/2015 09:53 | 102 |

FIG. 9

DOCUMENT ID: 12345678
DOCUMENT NAME: ORDER RECEPTION FORM

| TOOL GROUP INFORMATION | |
|---|---|
| TOOL GROUP ID | TOOL GROUP NAME |
| 10000000 | ORDER RECEPTION OPERATION VIA FACSIMILE |

| TOOL INFORMATION LIST | | | |
|---|---|---|---|
| ID OF EXECUTED TOOL | NAME OF EXECUTED TOOL | DATE/TIME OF EXECUTION | USER ID OF EXECUTOR |
| 40013456 | FACSIMILE RECEPTION | 03/27/2015 09:53 | 102 |
| 40013854 | PDF CONVERSION | 03/27/2015 12:48 | 102 |
| 40015875 | REMOVING BORDER | 03/27/2015 14:25 | 102 |

FIG. 14
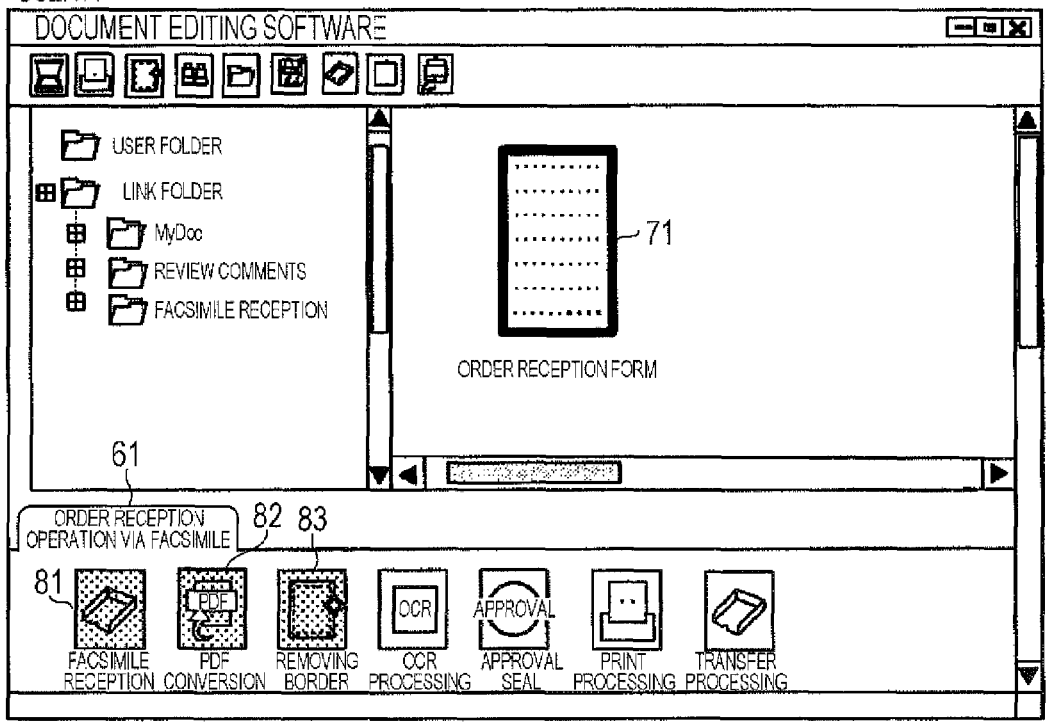
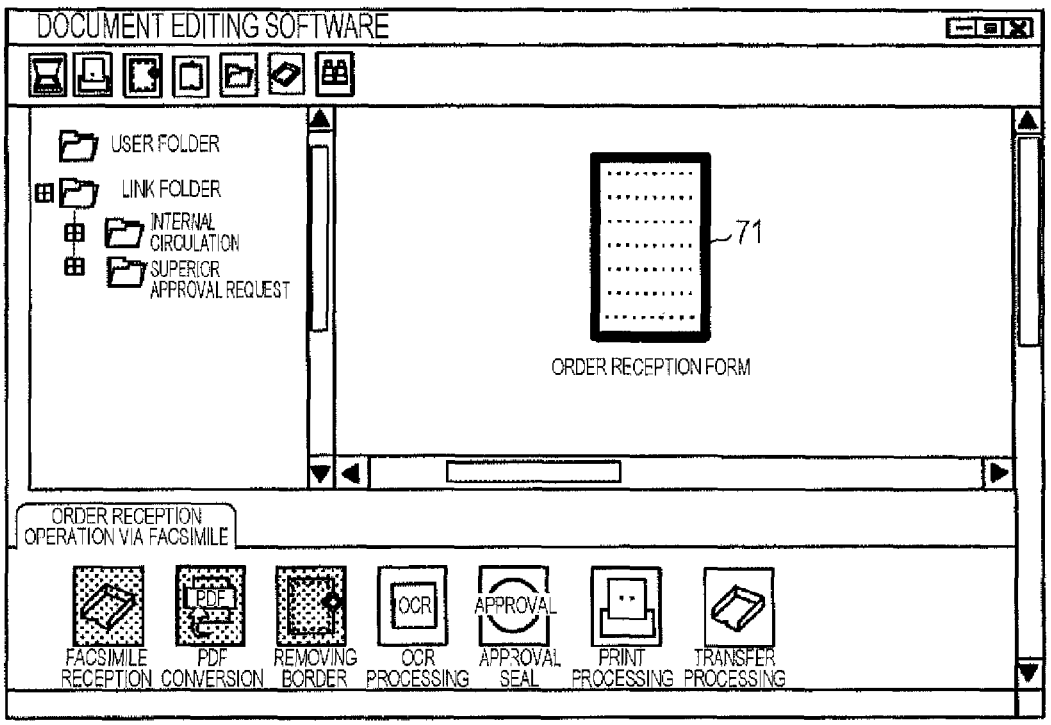

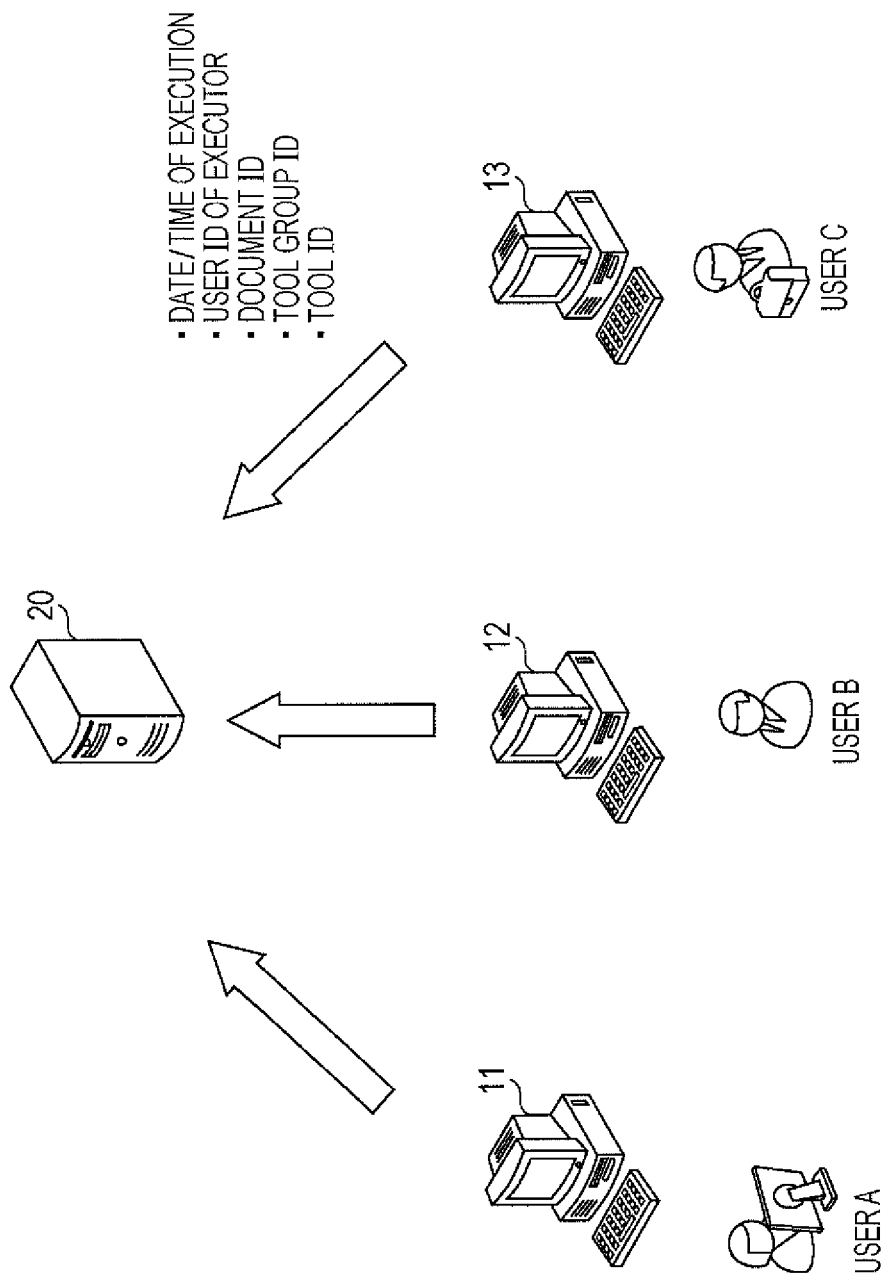

FIG. 17

| DOCUMENT NAME | USER NAME | TOOL GROUP NAME | TOOL NAME | DATE/TIME OF EXECUTION |
|---|---|---|---|---|
| FAX000315 | USER A | ORDER RECEPTION OPERATION VIA FACSIMILE | CONFIRMED | 03/27/2015 09:53 |
| FAX000411 | USER C | APPROVAL OPERATION | APPROVAL REQUEST | 07/27/2015 12:44 |
| FAX000512 | USER A | ORDER RECEPTION OPERATION VIA FACSIMILE | STORING IN SPECIFIED FOLDER | 06/18/2015 15:22 |
| FAX000856 | USER A | ORDER RECEPTION OPERATION VIA FACSIMILE | STORING IN SPECIFIED FOLDER | 08/20/2015 11:05 |
| FAX001021 | USER B | APPROVAL OPERATION | APPROVAL REQUEST | 06/06/2015 14:12 |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-164820 filed Aug. 24, 2015.

BACKGROUND

Technical Field

The present invention relates to an information processing apparatus, an information processing method, and a non-transitory computer readable medium.

SUMMARY

According to an aspect of the invention, there is provided an information processing apparatus including a first accepting unit, a second accepting unit, a process performing unit, a memory, and a display controller. The first accepting unit accepts specified document data. The second accepting unit accepts a specified processing function to be executed on the document data. The process performing unit performs, on the document data, a process corresponding to the processing function accepted by the second accepting unit. The memory stores information about processing function groups each constituted by plural processing functions indicating processes to be performed on document data, and stores, in association with one another, the document data accepted by the first accepting unit, a processing function group to which the processing function accepted by the second accepting unit belongs, and a processing function that has been executed on the document data. The display controller performs control to display, in a case where the first accepting unit accepts again the specified document data, the processing function group that is stored in the memory in association with the specified document data in such a manner that the processing function that has been executed is identifiable.

BRIEF DESCRIPTION OF THE DRAWINGS

An exemplary embodiment of the present invention will be described in detail based on the following figures, wherein:

FIG. 7 is a diagram illustrating a state where, as a result of a tool button having been operated, information about the tool group and information about the tool ID of the tool that has been executed are added to an attribute table of the document data;

FIG. 9 is a diagram for describing a state where information, such as the tool IDs of tools, namely, "PDF conversion" and "removing border", respectively corresponding to tool buttons, and so on, is added to an attribute table as information about the executed tools;

FIG. 14 is a diagram for describing an operation performed in a case where document data is transferred from a user A's information processing apparatus to a user B's information processing apparatus;

FIG. 16 is a diagram illustrating a state where, each time a process is performed on document data, history information (log information) about the performed process is transferred from a corresponding one of the information processing apparatuses of the respective users to a server apparatus; and FIG. 17 is a diagram illustrating an example of progress information about processing for each piece of document data accumulated in the server apparatus.

DETAILED DESCRIPTION

Hereinafter, an exemplary embodiment of the present invention will be described in detail with reference to the drawings.

Figure 1:
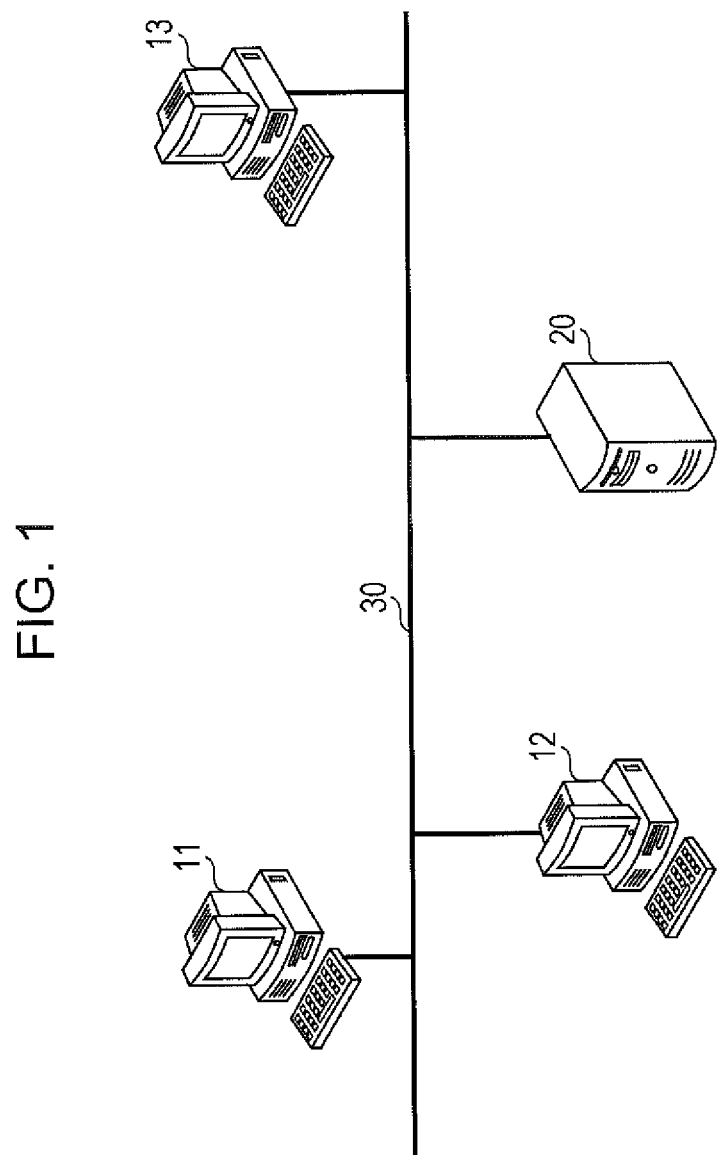
FIG. 1 is a diagram illustrating a configuration of a document management system according to one exemplary embodiment of the present invention.

FIG. 1 is a diagram illustrating a system configuration of a document management system according to one exemplary embodiment of the present invention.

The document management system according to one exemplary embodiment of the present invention includes information processing apparatuses 11 to 13, which are personal computers, for example, and a server apparatus 20 that are connected to one another over a network 30, as illustrated in FIG. 1.

On the information processing apparatuses 11 to 13, document editing software is installed, with which it is possible to edit or create document data.

On each of the information processing apparatuses 11 to 13, similar document editing software is installed, and therefore, the information processing apparatuses 11 to 13 are able to transmit/receive generated document data to/from each other and to view or correct the generated document data.

The server apparatus 20 is connected to the information processing apparatuses 11 to 13 over the network 30 and is able to store data generated by the information processing apparatuses 11 to 13. The information processing apparatuses 11 to 13 are able to read data stored in the server apparatus 20, and therefore, are able to exchange data with each other via the server apparatus 20.

Figure 2:
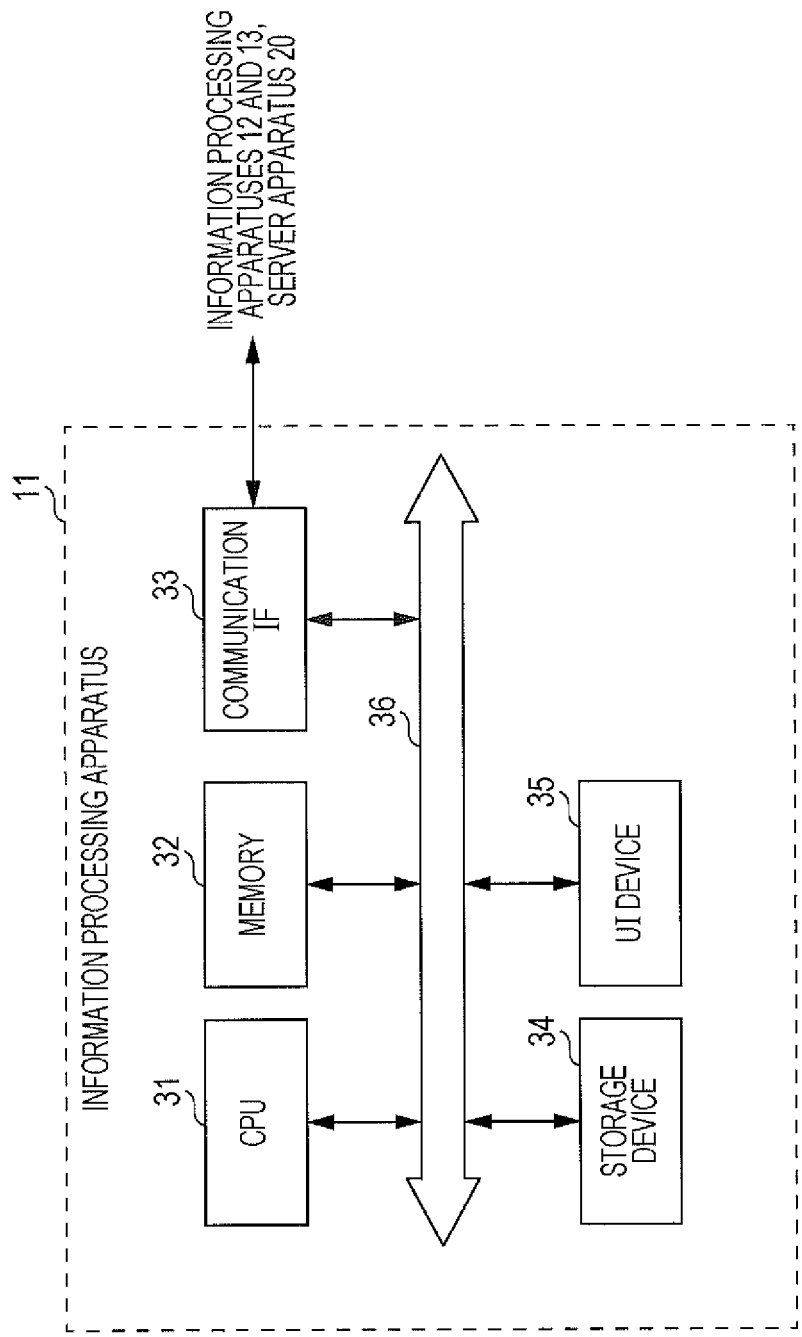
FIG. 2 is a block diagram illustrating a hardware configuration of an information processing apparatus according to one exemplary embodiment of the present invention.

A hardware configuration of the information processing apparatus 11 in the document management system of this exemplary embodiment is illustrated in FIG. 2. The configurations of the information processing apparatuses 12 and 13 are the same as that of the information processing apparatus 11, and therefore, description thereof will be omitted.

The information processing apparatus 11 includes a central processing unit (CPU) 31, a memory 32, a communication interface (IF) 33 for transmitting/receiving data to/from an external apparatus and the like over the network 30, a storage device 34, such as a hard disk drive (HDD), and a user interface (UI) device 35 that includes a touch panel or crystal liquid display and a keyboard, as illustrated in FIG. 2. These constituent elements are connected to one another via a control bus 36.

The CPU 31 executes a predetermined process in accordance with a control program stored in the memory 32 or the storage device 34 to thereby control an operation of the information processing apparatus 11. In this exemplary embodiment, a description is given while assuming that the CPU 31 reads and executes the control program stored in the memory 32 or the storage device 34; however, the program may be stored in a storage medium, such as a compact disc read-only memory (CD-ROM) or the like, and may be provided to the CPU 31 from the storage medium.

Figure 3:
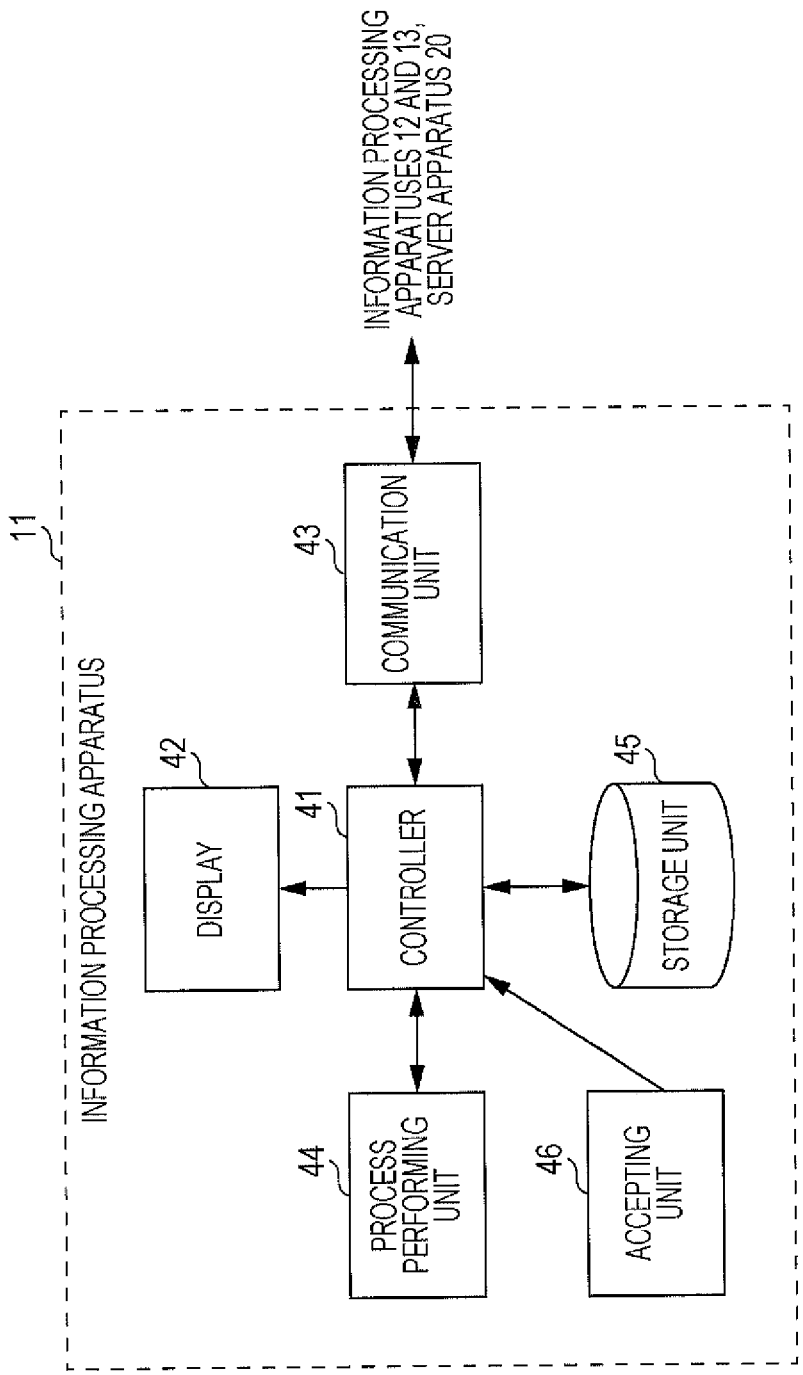
FIG. 3 is a block diagram illustrating a functional configuration of the information processing apparatus according to one exemplary embodiment of the present invention.

FIG. 3 is a block diagram illustrating a functional configuration of the information processing apparatus 11 implemented by the control program described above being executed.

The information processing apparatus 11 of this exemplary embodiment includes a controller 41, a display 42, a communication unit 43, a process performing unit 44, a storage unit 45, and an accepting unit 46, as illustrated in FIG. 3.

The accepting unit 46 accepts specified document data and a specified tool (processing function) to be executed for the document data.

In a case where plural tool groups are stored in the storage unit 45 in association with the document data, the accepting unit 46 accepts a specified tool group to be displayed among the plural tool groups when accepting the specified document data.

The storage unit 45 stores information about tool groups (processing function groups) each constituted by plural tools (processing functions) indicating processes to be performed on document data, and further stores, in association with one another, document data accepted by the accepting unit 46, a tool group to which a tool accepted by the accepting unit 46 belongs, and a tool that has been executed for the document data.

The display 42 displays information about document data, a tool group, and so on in accordance with control performed by the controller 41.

The communication unit 43 performs communication with the information processing apparatuses 12 and 13, the server apparatus 20, and so on in accordance with control performed by the controller 41, and transmits/receives document data and various types of information to/from these apparatuses.

The process performing unit 44 performs a process corresponding to a tool that is accepted by the accepting unit 46 on document data.

In a case where the accepting unit 46 accepts again the same specified document data, the controller 41 controls the display 42 to display a tool group stored in the storage unit 45 in association with the specified document data so that a tool that has been executed is identifiable. For example, the controller 41 may perform control to indicate "executed" on or above a tool button for a tool that has been executed.

In a case where the accepting unit 46 accepts a specified tool group that is desired to be displayed among plural tool groups, the controller 41 controls the display 42 to display the specified tool group that is accepted.

In a case where a tool that is accepted by the accepting unit 46 is a tool that is to be executed last in a tool group to which the tool belongs, the controller 41 may send a notification for prompting the user to associate a new tool group with the document data.

Note that the controller 41 performs control to display a tool group stored in the storage unit 45 so as to enable selection of each tool included in the tool group.

In a case of displaying a tool group, the controller 41 performs control to display a tool that has been executed in a form different from a form in which a tool that has not been executed is displayed. For example, the controller 41 performs control to display a tool that has been executed as a tool button in a grayed-out state.

Note that information about a tool group may include information about a sequence in which plural tools are to be executed, and the controller 41 may perform control to display a tool that is accepted by the accepting unit 46 and tools that precede the tool in the sequence of execution as tools that have been executed for the document data.

The controller 41 adds, to document data, information about tools that have been executed for the document data as attribute information. The controller 41 transmits the document data to which the attribute information is added, to other information processing apparatuses, such as the information processing apparatuses 12 and 13, via the communication unit 43.

The controller 41 receives document data to which information about a tool that has been executed for the document data is added as attribute information from other information apparatuses, such as the information processing apparatuses 12 and 13.

The storage unit 45 then stores the document data received by the controller 41 and the information about a tool that has been executed, the information being added to the document data, in association with each other.

The controller 41 transfers information about a tool that has been executed for document data to the server apparatus 20, which is an external apparatus accessible by the other information processing apparatuses, namely, the information processing apparatuses 12 and 13.

The controller 41 obtains from the server apparatus 20 information about the progress state of a tool that has been executed for document data accepted by the accepting unit 46.

The controller 41 then controls the display 42 to display the obtained information about the progress state of a process corresponding to the tool, which has been performed on the document data.

Now, an operation of the document management system of this exemplary embodiment is described in detail with reference to the drawings.

Figure 4:
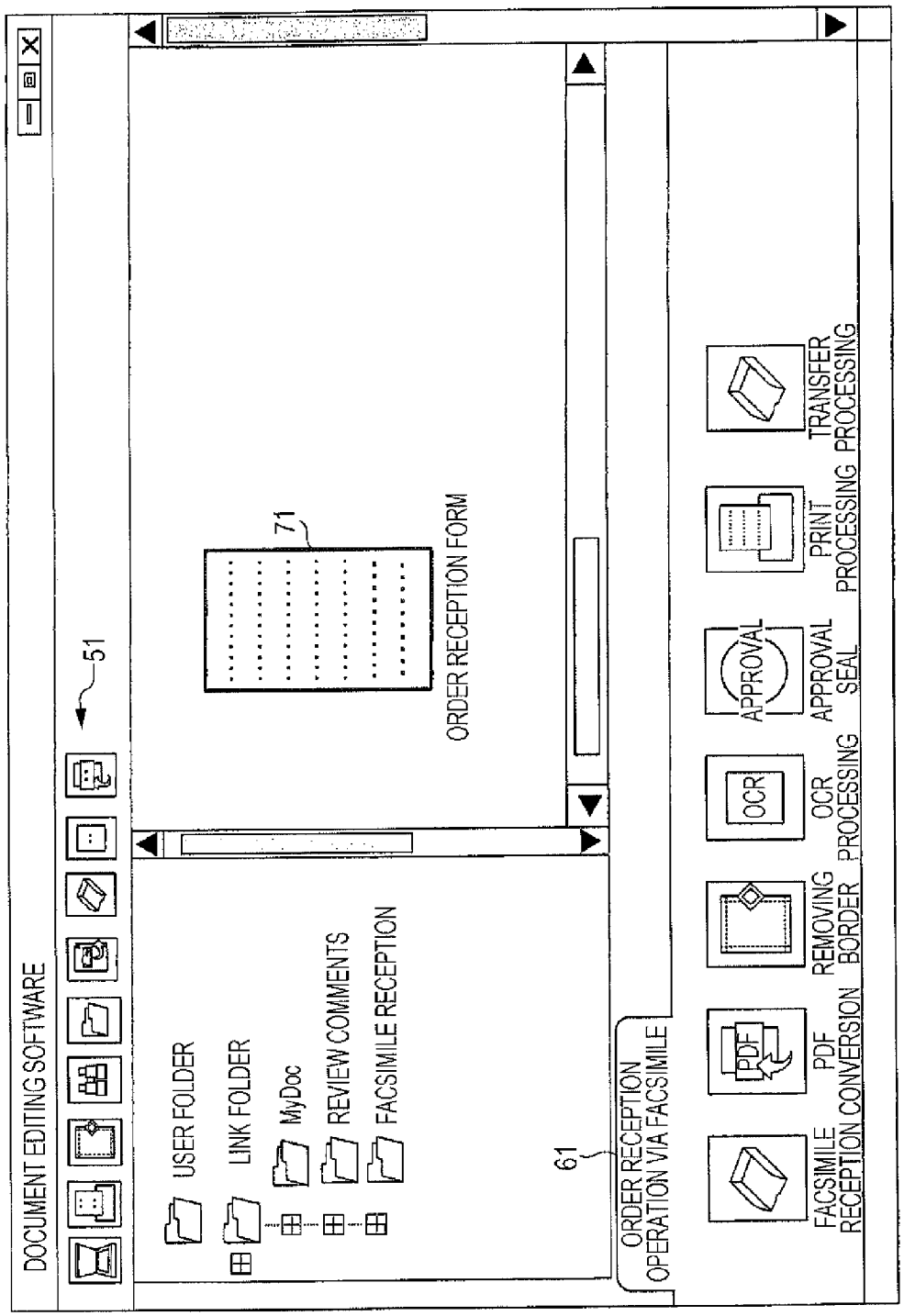
FIG. 4 is a diagram illustrating an example of a screen displayed in a case where a display displays a tool group on a document data editing screen.

An example of a screen displayed in a case where the display 42 of the information processing apparatus 11 displays a tool group on a document data editing screen is illustrated in FIG. 4.

In the example of the displayed screen illustrated in FIG. 4, document data 71 named "order reception form" is illustrated. In the example of the displayed screen, various functions that are to be executed on the document data are displayed on a toolbar 51 as tools.

Further, the example of the displayed screen illustrated in FIG. 4 illustrates a state where a tool group 61 named "order reception operation via facsimile" is set separately from the toolbar 51. In FIG. 4, tools of "facsimile reception", "PDF conversion", "removing border", "OCR processing", "approval seal", "print processing", and "transfer processing" are set in the tool group 61. Note that, in the tool group 61, the sequence of execution indicating that the tools are to be executed in order from the leftmost tool first is set.

Figure 5:
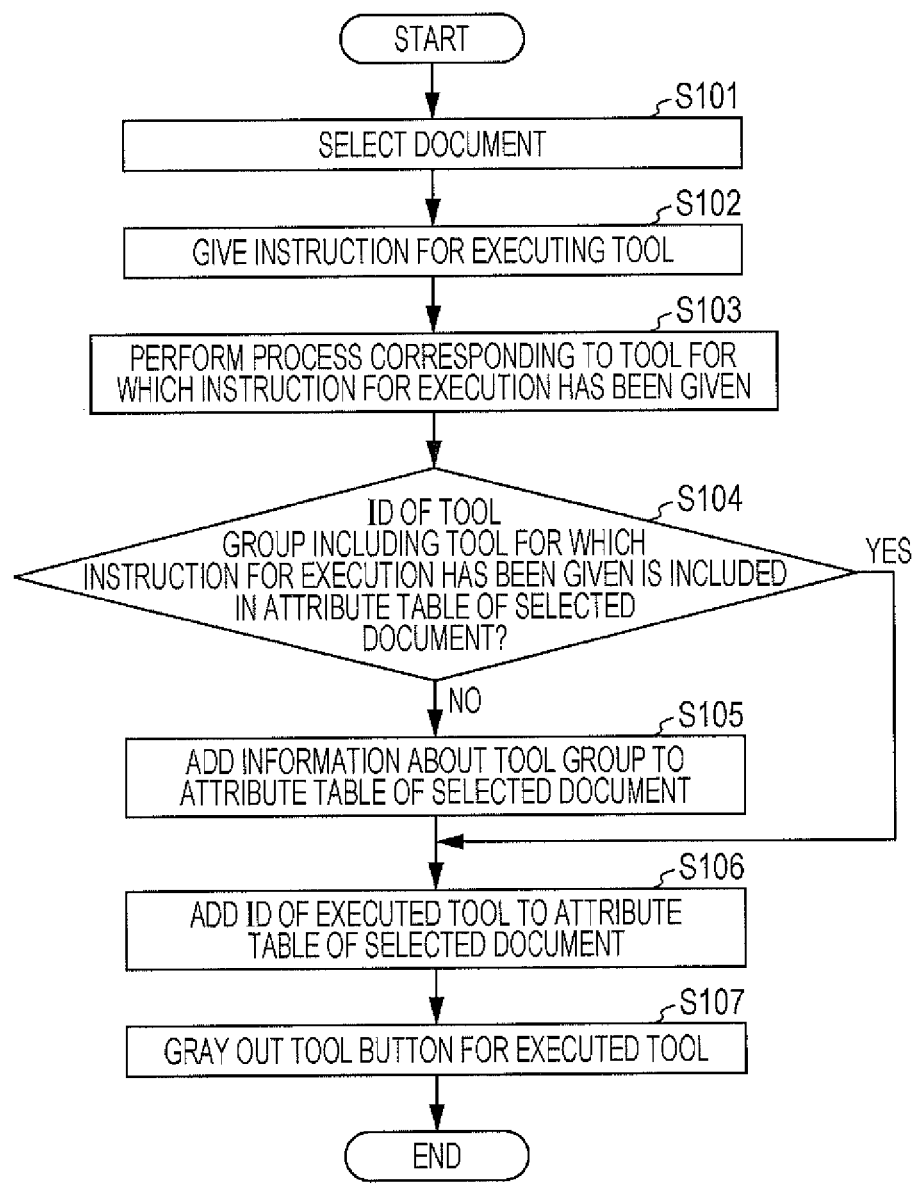
FIG. 5 is a flowchart for describing an operation performed by the information processing apparatus in a case where a tool button in a tool group is operated.

Next, an operation performed by the information processing apparatus 11 in a case where a tool button in the tool group is operated in the example of the displayed screen illustrated in FIG. 4 is described with reference to the flowchart in FIG. 5.

First, a user selects document data on which a process is to be performed by using the tool group (step S101). In the example of the displayed screen illustrated in FIG. 4, the document data 71 named "order reception form" is selected, and therefore, the outline is displayed with a thicker line.

In the state where the document data is selected, the user presses a tool button in the tool group to thereby give an instruction for executing a tool (step S102). Here, a description is given while assuming a case where the user operates a tool "facsimile reception", which is the first tool in the tool group.

When the tool button is pressed, the process performing unit 44 performs a process corresponding to the tool button (step S103). Here, in response to pressing of the tool button "facsimile reception", a screen for viewing the document data received via facsimile opens.

Then, the controller 41 determines whether the tool group ID of the tool group that includes the tool for which the instruction for execution has been given is included in an attribute table of the selected document data (step S104).

Here, an attribute table corresponding to the document data 71 named "order reception form" has not been created (No in step S104), and therefore, the controller 41 creates an attribute table that corresponds to the selected document data and adds, to the attribute table, information about the tool group to which the tool for which the instruction for execution has been given belongs (step S105).

Specifically, the controller 41 adds, to the attribute table of the document data 71, information about the tool group to which the tool "facsimile reception" for which the instruction for execution has been given belongs. When the user selects a tool for performing a process on a document and the process is performed on the document, the document and the tool group are associated with each other and stored, and therefore, it is possible to store the document and the tool group in association with each other without the user having to intentionally perform an operation for associating the document with the tool group.

The controller 41 adds the tool ID of the tool that has been executed to the attribute table (step S106). Specifically, the controller 41 adds the tool ID of the tool "facsimile reception" to the attribute table of the document data 71 as the tool ID of an executed tool.

The controller 41 controls the display 42 to gray out and display the tool button for the executed tool so that the user is able to identify the tool as a tool that has been executed (step S107).

Figure 6:
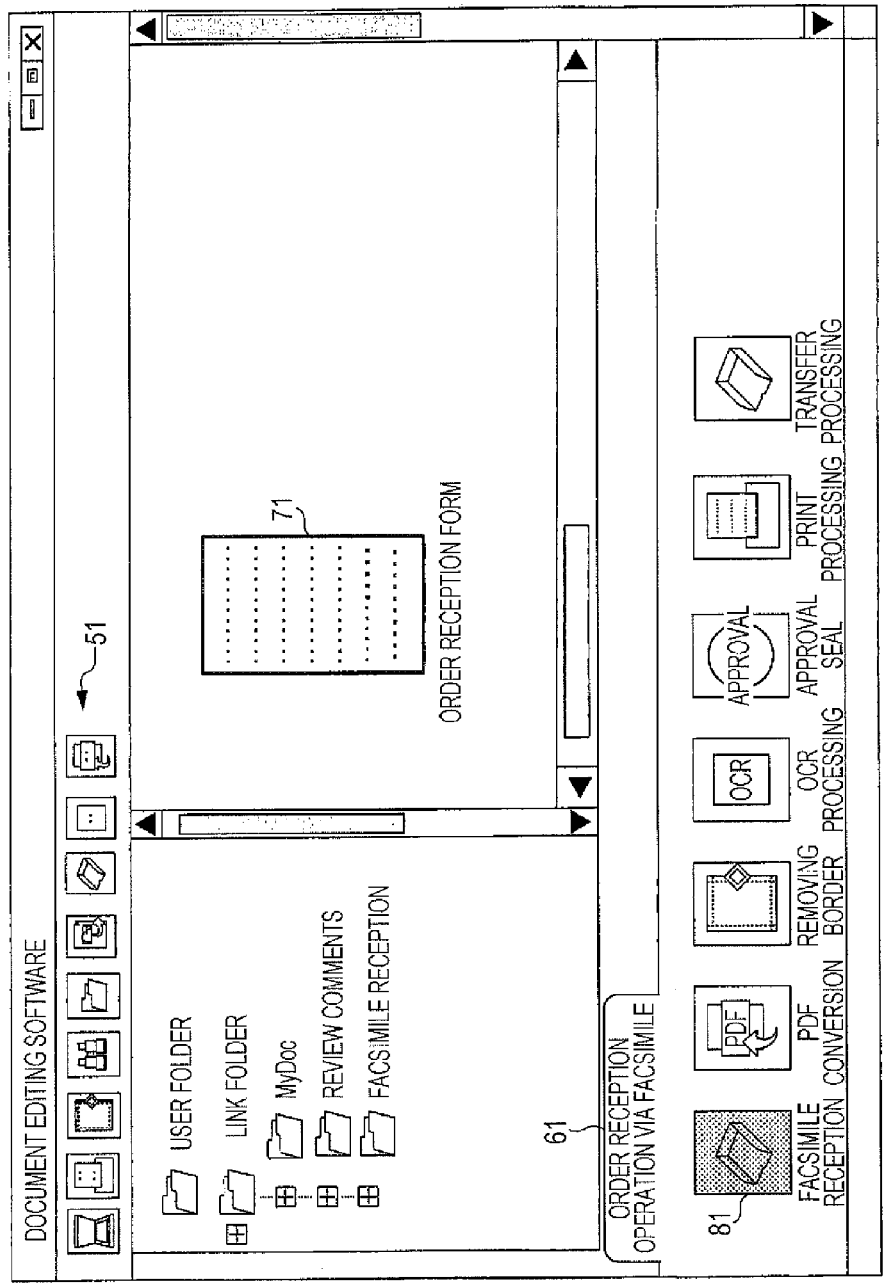
FIG. 6 is a diagram illustrating a state where a tool button in a tool group is grayed out and displayed so that the tool is identifiable as a tool that has been executed.

For example, a tool button 81, which is the first tool button in the tool group 61, is grayed out and displayed so that that the tool is identifiable as a tool that has been executed, as illustrated in FIG. 6. Note that, in FIG. 6, the tool button 81, which is shaded, is illustrated for ease of illustration; however, the tool button 81 is actually displayed while the color thereof changes to gray so that the tool is identifiable as a tool that has been executed.

A state where, as a result of the tool button 81 having been operated as described above, information about the tool group and information about the tool ID of the tool that has been executed are added to the attribute table of the document data 71 is illustrated in FIG. 7.

In the example of the attribute table illustrated in FIG. 7, the tool group ID and the tool group name "order reception operation via facsimile" are registered as tool group information, and the ID of the executed tool, the name of the executed tool, the date/time of execution, and the user ID of the executor are registered in a tool information list for the document data 71 "order reception form".

Figure 8:
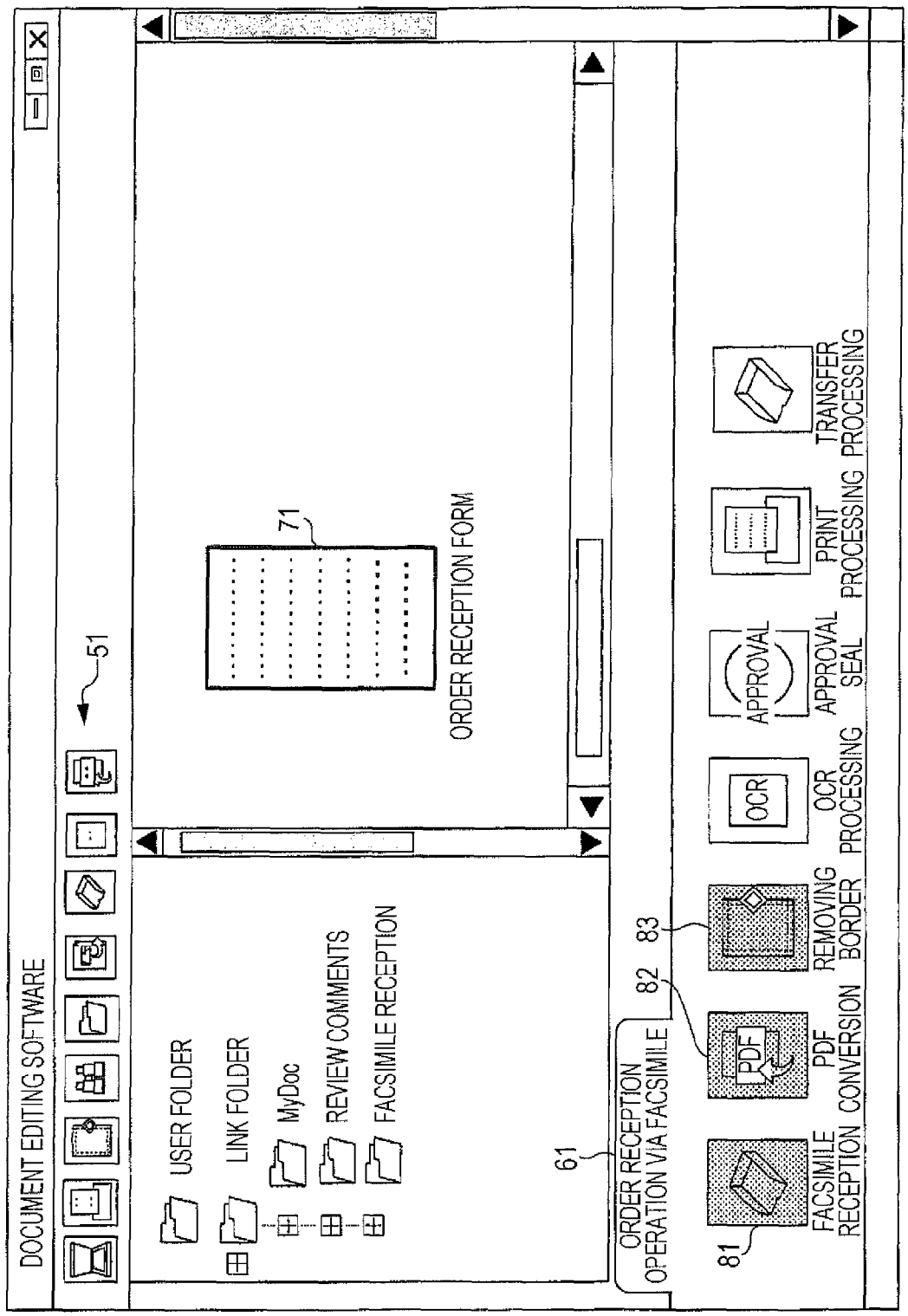
FIG. 8 is a diagram illustrating an example of a screen displayed in a case where tool buttons are operated by a user one by one and processes are sequentially performed on document data accordingly.

In a case where processes are performed on the document data 71 sequentially when the user operates tool buttons 82 and 83 one by one, as in the example of the displayed screen illustrated in FIG. 8, the attribute table is updated as illustrated in FIG. 9.

In response to execution of the tools of "pdf conversion" and "removing border" that respectively correspond to the tool buttons 82 and 83, information, such as the IDs of the tools, and so on, is added to the attribute table illustrated in FIG. 9 as information about the executed tools.

In the examples of the displayed screens illustrated in FIG. 6 and FIG. 8, the document data 71 named "order reception form" and the tool group 61 named "order reception operation via facsimile" are associated with each other and displayed. Now, an operation performed in a case where different tool groups are respectively associated with two pieces of document data is described.

Figure 10:
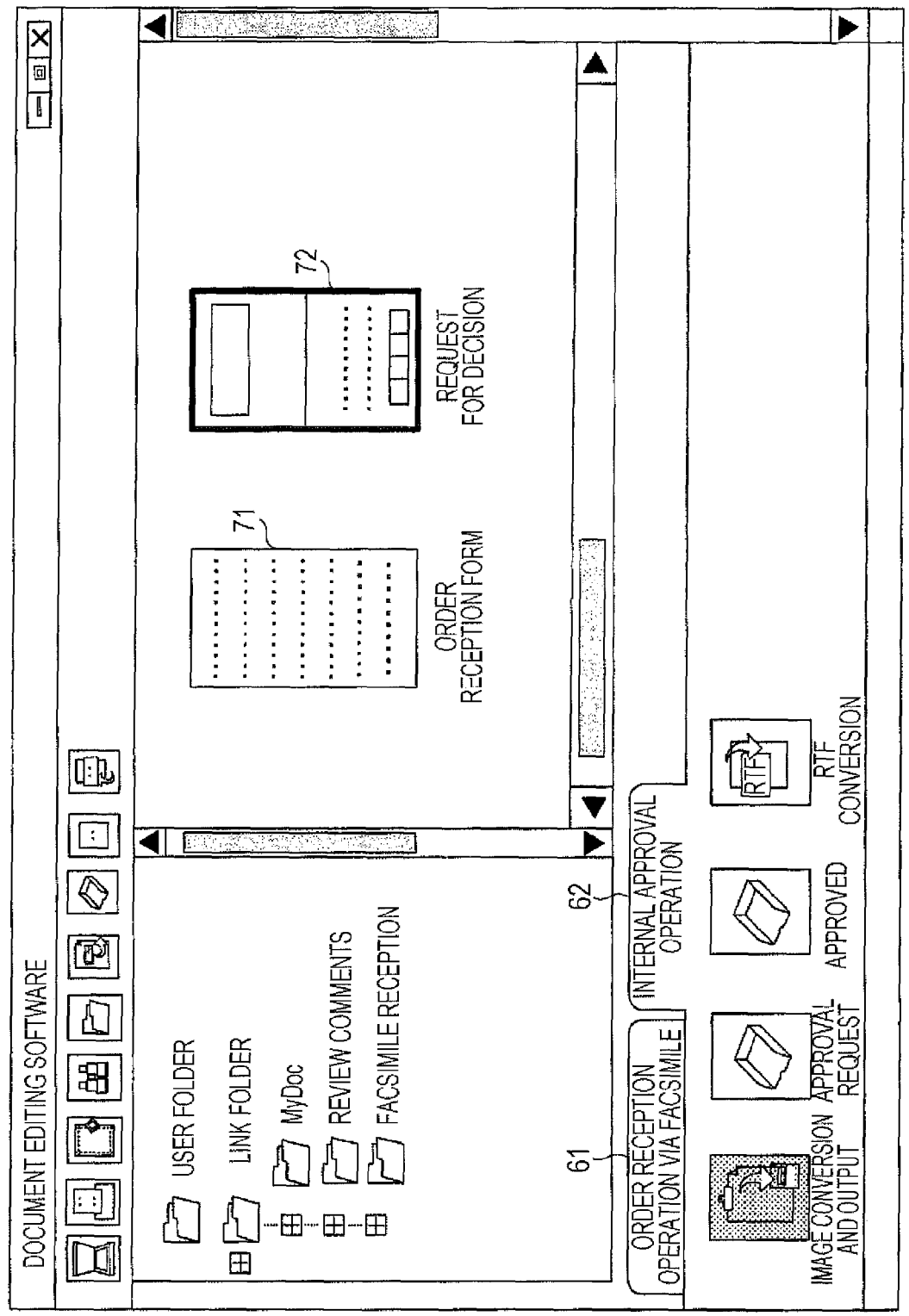
FIG. 10 illustrates an example of a screen displayed in a case where a tool group named "order reception operation via facsimile" is associated with document data named "order reception form", and a tool group named "internal approval operation" is associated with document data named "request for decision"

FIG. 10 illustrates an example of a screen displayed in a case where the tool group 61 named "order reception operation via facsimile" is associated with the document data 71 named "order reception form", and a tool group 62 named "internal approval operation" is associated with document data 72 named "request for decision".

The controller 41 performs control to display the tool groups 61 and 62 respectively associated with the document data 71 and the document data 72 as tabs and to switch the displayed tool group between the tool groups 61 and 62 each time switching between the tabs is performed.

Even in a case where plural pieces of document data are handled by the document editing software, the pieces of document data and tool groups are set in association with each other, and therefore, in response to selection of a piece of document data, a tool group that is associated with the piece of document data is displayed.

Specifically, in FIG. 10, in response to selection of the document data 72 named "request for decision", the tool group 62 named "internal approval operation" that is associated with the document data 72 "request for decision" is displayed.

Figure 11:
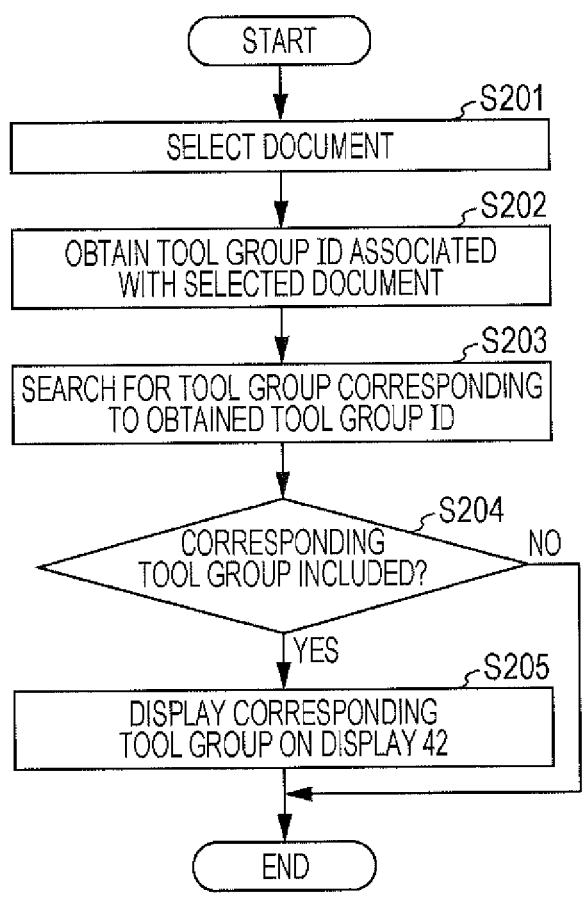
FIG. 11 is a flowchart for describing an operation performed when document data is selected.

Now, a description is given of an operation performed when document data is selected as described above, with reference to the flowchart illustrated in FIG. 11.

When document data is selected (step S201), the controller 41 obtains a tool group ID associated with the selected document data from the attribute table illustrated in FIG. 7 or FIG. 9, for example (step S202).

Then, the controller 41 searches for a tool group that corresponds to the obtained tool group ID (step S203) and determines whether a tool group that corresponds to the obtained tool group ID is included in tool groups registered in advance by the document editing software (step S204).

If a tool group that corresponds to the obtained tool group ID is included (Yes in step S204), the controller 41 controls the display 42 to display the corresponding tool group (step S205).

In step S204, if a tool group that corresponds to the obtained tool group ID is not included (No in step S204), a tool group that corresponds to the document data is not present, and therefore, the controller 41 does not perform control to display a tool group even when the document data is selected.

Figure 12:
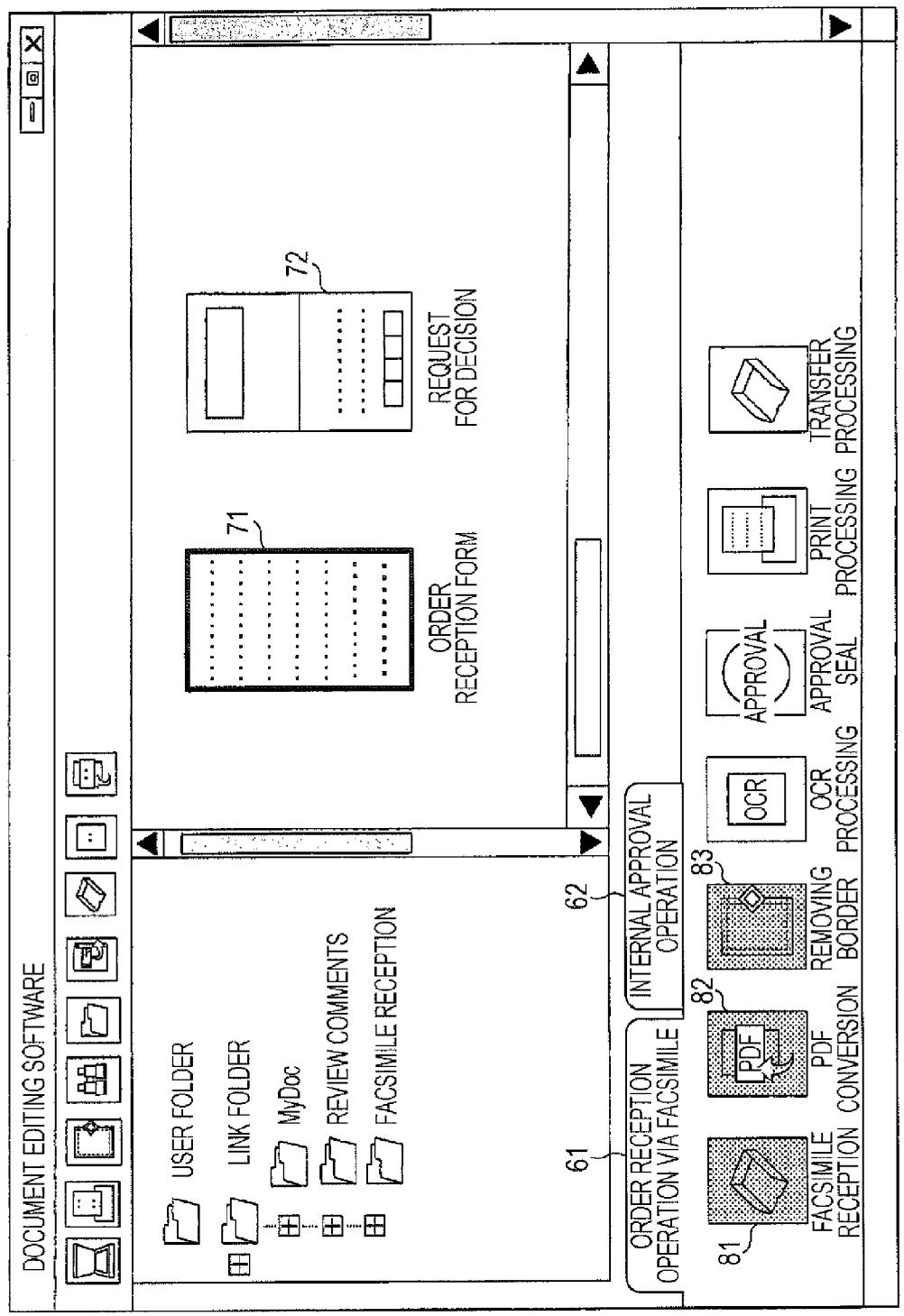
FIG. 12 is a diagram illustrating an example of a screen displayed when the same document data is selected again.

By performing the process described above, in a case where the document data 71 named "order reception form" is selected again on the example display screen as illustrated in FIG. 10, the tool group 61 named "order reception operation via facsimile" that corresponds to the document data 71 is displayed, as illustrated in FIG. 12.

As seen from FIG. 10 and FIG. 12, when document data is selected on which a process is to be performed, switching is performed to display a tool group associated with the selected document data. Accordingly, the user is able to know processes to be performed on the document data without having to intentionally memorize what processes need to be performed on which document data.

In FIG. 12, in response to selection of the document data 71 named "order reception form", switching between the tabs of the tool groups is performed, and the tool group 61 named "order reception operation via facsimile" is displayed. Even in a case where the tool group 61 is displayed again, the tool buttons 81 to 83 are displayed in a grayed-out state, and therefore, processes corresponding to tools that correspond to the tool buttons 81 to 83 are identifiable as processes that have been performed.

In a case where document data is selected again as described above, graying-out processing is performed on tool buttons for tools that have been executed, on the basis of information about the tool IDs of executed tools in the attribute table of the document data. However, tools that precede the executed tools in the sequence of execution may be grayed out and displayed as tool buttons for tools that have been executed for the document data instead of graying out only the tool buttons for the executed tools.

Figure 13:
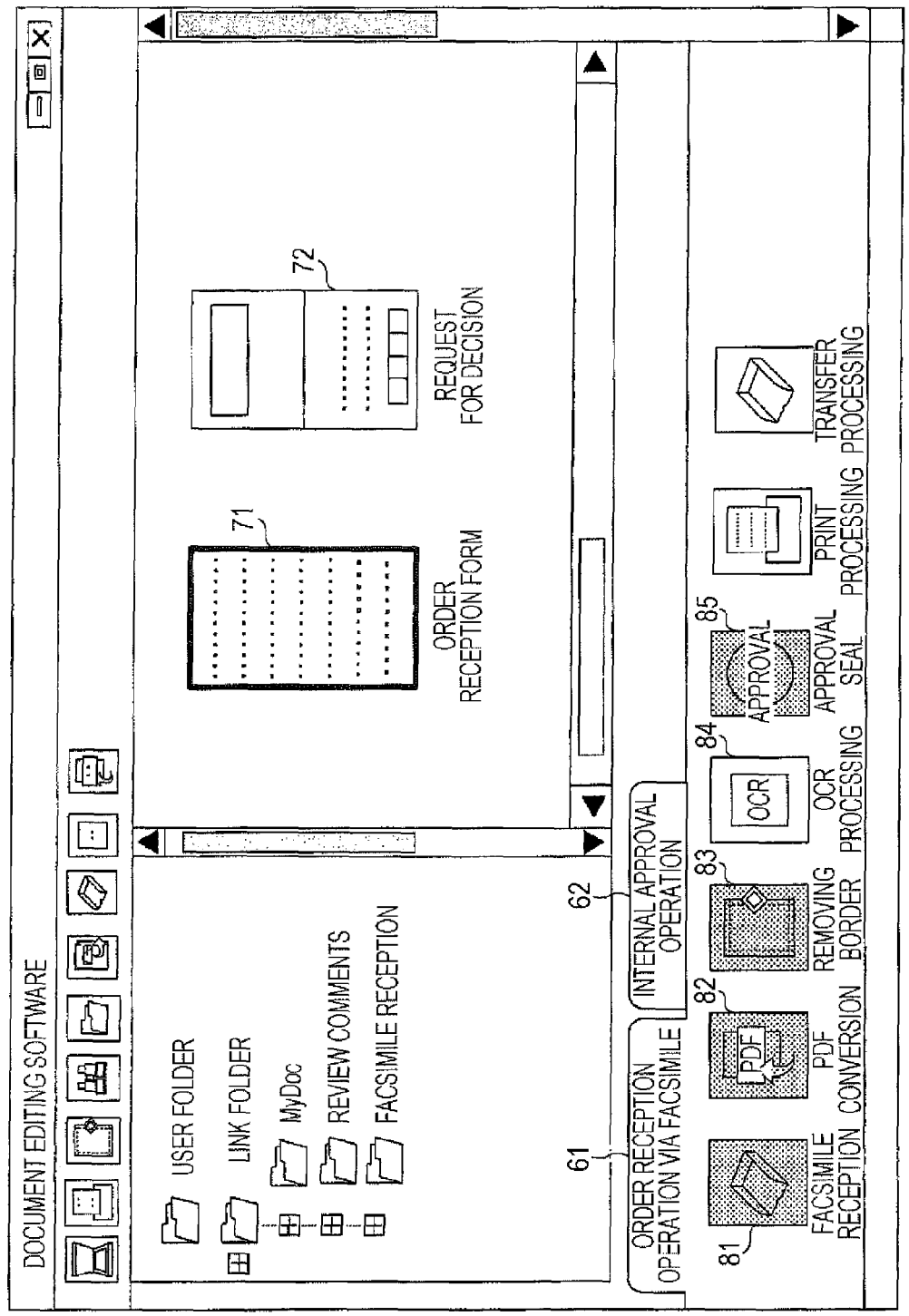
FIG. 13 is a diagram illustrating an example of a screen displayed in a case where tools corresponding to the first to third and fifth tool buttons have been executed and a tool corresponding to the fourth tool button has not been executed.

For example, in a case where tools corresponding to the tool buttons 81 to 83 and 85 have been executed and a tool corresponding to a tool button 84 has not been executed, as illustrated in FIG. 13, it may be assumed that tools corresponding to the tool buttons 81 to 85 have been executed, and all of the tool buttons 81 to 85 may be grayed out and displayed.

The above-described operation performed in the document management system of this exemplary embodiment is an operation performed in a case where one information processing apparatus, namely, the information processing apparatus 11, processes and edits document data. Hereinafter, a case where one piece of document data is processed and edited by plural users is described.

For example, a description is given while assuming a case where the document data 71 is transferred from a user A's information processing apparatus to a user B's information processing apparatus, as illustrated in FIG. 14.

Here, to the document data 71 transferred from the user A's information processing apparatus to the user B's information processing apparatus, tool group information and a tool information list of executed tools as illustrated in FIG. 9 are added as attribute information.

Accordingly, the user B's information processing apparatus, in which the tool group named "order reception operation via facsimile" is set as in the user A's information processing apparatus, associates the transferred document data 71 with the tool group named "order reception operation via facsimile" and, in response to selection of the document data 71, grays out and displays the tools of "facsimile reception", "pdf conversion", and "removing border" as tool buttons for tools that have been executed.

As described above, even in the case where plural users are involved in processes performed on one piece of document data, by transferring the one piece of document data from a user to the other user, the progress state of the processes are shared between the users as long as the same tool group is set in advance in the information processing apparatuses of the respective users.

Now, an example of processing in a case where three users, namely, user A to user C, are involved in processes performed on one piece of document data by using different tool groups is described with reference to FIG. 15 to FIG. 17.

Figure 15:
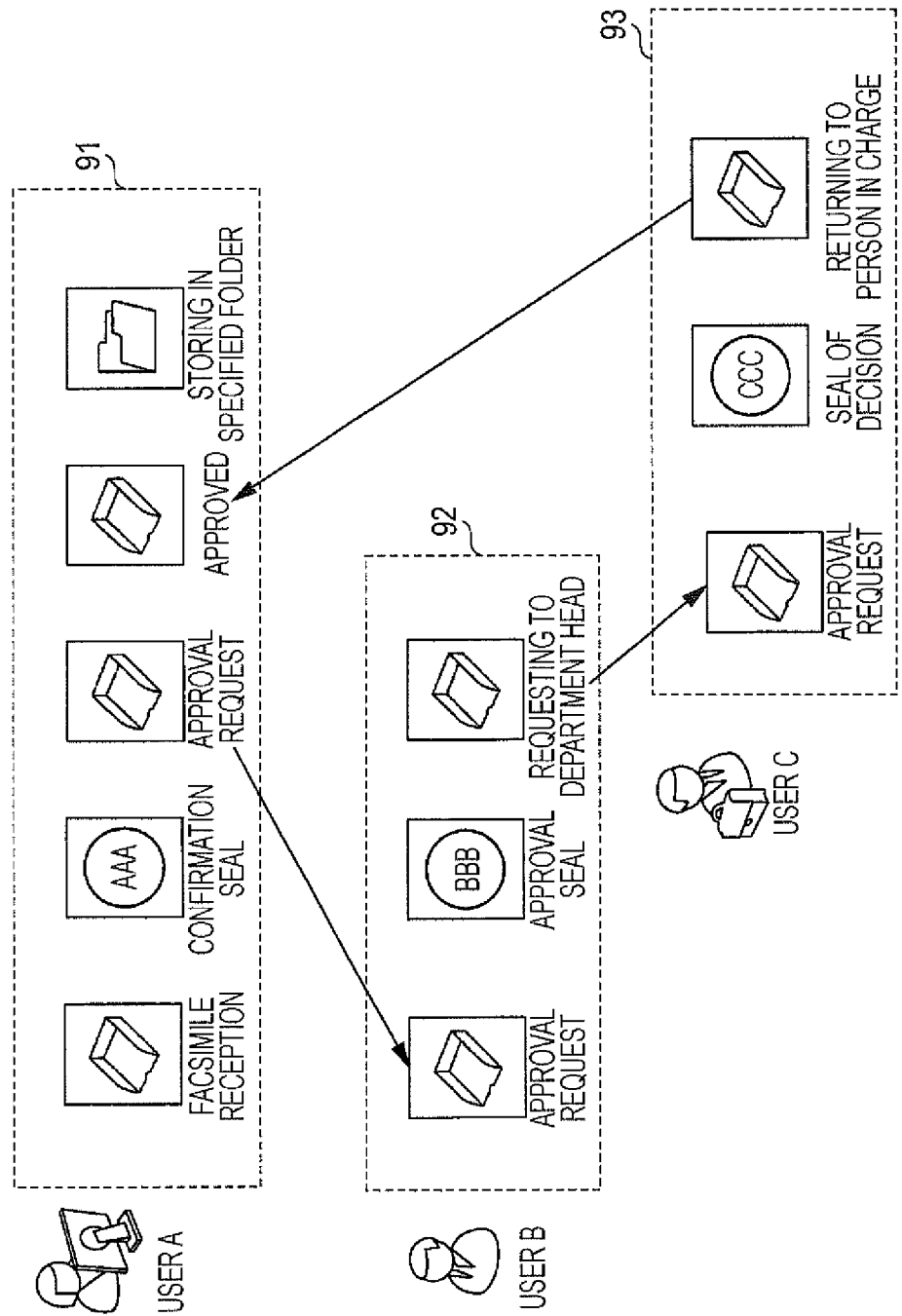
FIG. 15 is a diagram illustrating tool groups respectively created in the information processing apparatuses of users A to C.

FIG. 15 is a diagram illustrating tool groups 91 to 93 respectively created in the information processing apparatuses of user A to user C.

In FIG. 15, a tool group constituted by tools of "facsimile reception", "confirmation seal", "approval request", "approved", and "storing in specified folder" is set in the user A's information processing apparatus.

A tool group constituted by tools of "approval request", "approval seal", and "requesting to department head" is set in the user B's information processing apparatus. A tool group constituted by tools of "approval request", "seal of decision", and "returning to person in charge" is set in the user C's information processing apparatus.

When user A affixes a confirmation seal to document data and thereafter operates the tool "approval request" to perform a process of storing the document data in the inbox, the display of the user B's inbox "approval request" is switched to indicate that a document has been transferred. Then, user B operates the tool "approval request" to receive the document data.

By performing similar processing, a series of processes are performed in which the document data to which user B affixes an approval seal is transferred to user C, the document data to which user C affixes a seal of decision is returned to user A, and the document data is finally stored in a specified folder.

As described above, in a case where plural users are involved in processes that are performed on the same document data using the respective tool groups, each time a process is performed on the document data, history information (log information) about the performed process is transmitted to the server apparatus 20 from a corresponding one of the information processing apparatuses 11 to 13 of the respective users, as illustrated in FIG. 16.

The history information includes the tool ID of the tool corresponding to the performed process, the tool group ID, the document ID of the document data on which the process has been performed, the user ID of the executor, information about the date/time of execution, and so on.

By transmitting, each time a process is performed on document data, history information about the performed process to the server apparatus 20 from a corresponding one of the information processing apparatuses 11 to 13 of the respective users, information with which the progress of processing is known for each piece of document data, as illustrated in FIG. 17, is accumulated in the server apparatus 20.

The server apparatus 20 registers therein information indicating a sequence in which processes corresponding to tools are performed on document data, and retains and manages only history information about a process performed last among pieces of history information transmitted from the information processing apparatuses 11 to 13.

Therefore, the information processing apparatuses 11 to 13 access the server apparatus 20 and refer to the retained history information to thereby grasp the progress of processing for each piece of document data.

For example, from the example of history information illustrated in FIG. 17, it is found that document data having a document name "FAX001021" is in a state where the tool "approval request" of user B has been executed, that is, in a state where user B has received an approval request but has not affixed an approval seal.

Modifications

In the above-described embodiment, the description has been given while assuming the case where the exemplary embodiment of the present invention is applied to document editing software; however, the exemplary embodiment of the present invention is not limited to this case. The exemplary embodiment of the present invention may be similarly applicable to software configured to perform editing operations on document data (document file) and the like.

For example, the exemplary embodiment of the present invention may be similarly applicable to software for performing editing operations on document data in portable information terminal apparatuses, such as smartphones, tablet terminals, and so on, in addition to software for editing document data in personal computers.

In the exemplary embodiment, a program executed by the information processing apparatus may be stored in a computer-readable recording medium, such as a magnetic recording medium (magnetic tape, magnetic disk (HDD or flexible disk (FD)), or the like), an optical recording medium (optical disk (compact disk (CD) or digital versatile disk (DVD)) or the like), a magneto-optical recording medium, or a semiconductor memory (flash ROM or the like), and provided therefrom. Alternatively, the program may be downloaded over a network, such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a first accepting unit that accepts specified document data;
a second accepting unit that accepts a specified processing function to be executed on the document data;
a process performing unit that performs, on the document data, a process corresponding to the processing function accepted by the second accepting unit;
a first memory that stores information about processing function groups, each of the processing function groups being constituted by a plurality of processing functions indicating processes to be performed on document data;
a second memory that stores, in association with one another, the specified document data accepted by the first accepting unit, and a processing function group, of the plurality of processing function groups stored in the first memory, the processing function group including the processing function accepted by the second accepting unit, when the process performing unit has performed, on the specified document data, the process corresponding to the processing function accepted by the second accepting unit; and
a display controller that, when the first accepting unit accepts the specified document after the second memory stores the specified document data and the processing function group in association with one another, performs control to display, together, the specified document and the processing function group stored in association with the specified document in the second memory, such that the processing function that has been executed is identifiable,
wherein the functions performed by the first accepting unit, the second accepting unit, the process performing unit and the display controller are achieved under control of a central processing unit (CPU).

2. The information processing apparatus according to claim 1, wherein
when displaying the processing function group, the display controller performs control to display the processing function that has been executed in a form different from a form in which a processing function that has not been executed is displayed.

3. The information processing apparatus according to claim 1, wherein
the information about each of the processing function groups includes information about a sequence in which the plurality of processing functions are to be executed, and
the display controller performs control to display the processing function accepted by the second accepting unit and a processing function that precedes the processing function accepted by the second accepting unit in the sequence of execution as processing functions that have been executed on the document data.

4. The information processing apparatus according to claim 1, further comprising:
an addition unit that adds, to document data, information about a processing function that has been executed on the document data as attribute information; and
a transmission unit that transmits the document data to which the attribute information is added by the addition unit to another information processing apparatus,
wherein the functions performed by the addition unit and the transmission unit are achieved under control of the CPU.

5. The information processing apparatus according to claim 1, further comprising:
- a reception unit that receives document data to which information about a processing function that has been executed on the document data is added as attribute information, wherein
- the second memory stores the document data received by the reception unit and the information about the processing function that has been executed on the document data, the information being added to the document data, in association with each other, and
- wherein the functions performed by the reception unit are achieved under control of the CPU.

6. The information processing apparatus according to claim 1, further comprising:
- a transfer unit that transfers information about a processing function that has been executed on document data to an external apparatus that is also accessible by another information processing apparatus; and
- an obtaining unit that obtains information about a progress state of a processing function that has been executed on the document data accepted by the first accepting unit from the external apparatus, wherein
- the display controller performs control to display the information about the progress state of the processing function that has been executed on the document data, the information being obtained by the obtaining unit, and
- the functions performed by the transfer unit and the obtaining unit are achieved under control of the CPU.

7. An information processing method comprising:
- storing information about processing function groups, each of the processing function groups being constituted by a plurality of processing functions indicating processes to be performed on document data;
- accepting specified document data;
- accepting a specified processing function to be executed on the document data;
- performing, on the document data, a process corresponding to the processing function that is accepted;
- storing, in association with one another, the specified document data that is accepted, and a processing function group, of the plurality of processing function groups stored in the first memory, the processing function group including the processing function that is accepted, when the process corresponding to the processing function accepted by the second accepting unit has been performed on the specified document data; and
- performing, when the specified document has been accepted after the specified document data and the processing function group are stored in association with one another, control to display, together, the specified document and the processing function group stored in association with the specified document, such that the processing function that has been executed is identifiable.

8. A non-transitory computer readable medium storing a program causing a computer to execute a process for information processing, the process comprising:
- storing information about processing function groups, each of the processing function groups being constituted by a plurality of processing functions indicating processes to be performed on document data;
- accepting specified document data;
- accepting a specified processing function to be executed on the document data;
- performing, on the document data, a process corresponding to the processing function that is accepted;
- storing, in association with one another, the specified document data that is accepted, and a processing function group, of the plurality of processing function groups stored in the first memory, the processing function group including the processing function that is accepted, when the process corresponding to the processing function accepted by the second accepting unit has been performed on the specified document data; and
- performing, when the specified document has been accepted after the specified document data and the processing function group are stored in association with one another, control to display, together, the specified document and the processing function group stored in association with the specified document, such that the processing function that has been executed is identifiable.

* * * * *